2,980,721

VINYLBENZYL DIALKYL PHOSPHONATES AND PREPARATION THEREOF

Elmer L. McMaster and William K. Glesner, Midland, Mich., assignors to The Dow Chemical Company, Midland, Mich., a corporation of Delaware No Drawing. Filed Dec. 12, 1958, Ser. No. 779,868

4 Claims. (Cl. 260—461)

This invention concerns vinylbenzyl dialkyl phosphonates and their method of preparation.

While various phosphonate esters are known to the art, none is known which is analogous to the polymer-yielding vinylbenzyl dialkyl phosphonates.

In accordance with this invention it has now been discovered that vinylbenzyl dialkyl phosphonates can be prepared by reacting a trialkyl phosphite with vinylbenzyl chloride, advantageously at a temperature between about 75° and 115° C., at atmospheric or substantially atmospheric pressure, and separating the vinylbenzyl dialkyl phosphonate by distillation under reduced pressure. Advantageously proportions between 1 and 5 moles, preferably 3 moles, of trialkyl phosphite per mole of vinylbenzyl chloride are utilized. By using an excess of trialkyl phosphite, the separation and recovery of vinylbenzyl chloride is simplified. Higher temperatures than 115° C. promote polymerization, especially in the absence of polymerization inhibitors, while at temperatures lower than 75° C., the reaction proceeds at a slow rate.

The products of this invention can be polymerized per se or copolyerized with other polymerizable, ethylenic unsaturated monomers, e.g., styrene, to form resins. Their crosslinked copolymers when hydrolyzed provide interesting cation exchange resins.

Any trialkyl phosphite having alkyl substituents containing from 1 to 8 carbon atoms can be used in the practice of this invention. Suitable trialkyl phosphites include trimethyl-, triethyl-, tri-i-propyl-, tributyl-, and tri-i-octyl phosphites.

Also any of the isomeric vinylbenzyl chlorides, and advantageously a commercial mixture thereof, can be used in the practice of this invention.

The following specific embodiments show ways in which the invention has been practiced and the advantages accruing therefrom.

Example 1

A quantity of 2713 g. (16.34 moles) of triethyl phosphite, 831 g. of a mixture of 32 percent o- and 68 percent p-vinylbenzyl chloride (5.45 moles) and 8.5 g. of dinitro-o-cresol as polymerization inhibitor were added to a 5-liter 3-neck flask provided with an air condenser, a thermocouple well, a heating mantle and a high-speed stirrer. The reaction mixture was stirred and heated for 10 hours at 90° C. The resulting product was distilled under reduced pressure, and that portion of the product which distilled at 116° to 126° C. at 0.5 mm. Hg absolute pressure was determined by infra-red analysis to be a mixture of o- and p-vinylbenzyl diethyl phosphonate. It had a density of 1.095 at 25° C. Chemical analysis showed 11.63 percent P compared with a theoretical value of 12.2 percent P.

Example 2

A quantity of 1480 g. triethyl phosphite
450 g. o,p-vinylbenzyl chloride
20 g. dinitro-o-cresol inhibitor was reacted at 90° C. for 21 hours in a 5-liter flask provided with a stirrer operating at 2100 r.p.m., a reflux condenser and a thermometer. After cooling, the flask contents weighed 1934 g. An amount of 10 g. dinitro-o-cresol was then added thereto and the charge was heated in a distillation flask having a 1-foot Vigreux column and a flash head to distill excess triethyl phosphite and unreacted vinylbenzyl chloride. The residue remaining after distillation amounted to 692 g. Infrared analysis supported the structure O,O-diethyl-o, p-vinylbenzyl phosphonate. Its yield was 96.5 percent of theory, vinylbenzyl chloride basis.

Example 3

A quantity of 3.402 g. o,p-vinylbenzyl diethyl phosphonate, 0.85 g. commercial divinylbenzene (50 wt. percent divinylbenzene), and 0.02 g. benzoyl peroxide was heated in a 4 dram vial at 85° C. for 12 hours. A hard copolymer resulted which was ground to 20 mesh in a Wiley mill. Analysis of the product gave 13.72 wt. percent P. A quantity of 2.0359 g. of the ground copolymer was heated with 100 ml. of concentrated hydrochloric acid for 4 hours at 90°–95° C. in a 250 ml. round bottomed flask provided with a reflux condenser. The resulting resin was washed with distilled water until free of chloride. Its ion exchange capacity was 55,000 grains calcium carbonate per cubic foot.

What is claimed is:

1. A vinylbenzyl dialkyl phosphonate wherein each alkyl group contains up to 8 carbon atoms.
2. Diethyl vinylbenzyl phosphonate.
3. A process for making a vinylbenzyl dialkyl phosphonate by heating proportions between 1 and 5 moles of a trialkyl phosphite and 1 mole of vinylbenzyl chloride at a temperature between about 75° and about 115° C., wherein each alkyl group contains up to 8 carbon atoms.
4. The process of claim 3, wherein the trialkyl phosphite is triethyl phosphite and the molecular proportion of triethyl phosphite to vinylbenzyl chloride is 3 to 1.

References Cited in the file of this patent

Kosolapoff: "J. Am. Chem. Soc.," 67, 2259–60 (1945).